(12) United States Patent
Ovari

(10) Patent No.: US 11,352,983 B2
(45) Date of Patent: Jun. 7, 2022

(54) MIXING DEVICE FOR PRODUCING A FUEL/WATER MIXTURE FOR AN INTERNAL COMBUSTION ENGINE, INTERNAL COMBUSTION ENGINE HAVING A MIXING DEVICE, AND MOTOR VEHICLE

(71) Applicant: Bayerische Motoren Werke Aktiengesellschaft, Munich (DE)

(72) Inventor: Zlatko Ovari, Roehrmoos (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/977,414

(22) PCT Filed: Mar. 28, 2019

(86) PCT No.: PCT/EP2019/057905
§ 371 (c)(1),
(2) Date: Sep. 1, 2020

(87) PCT Pub. No.: WO2019/206555
PCT Pub. Date: Oct. 31, 2019

(65) Prior Publication Data
US 2021/0047986 A1    Feb. 18, 2021

(30) Foreign Application Priority Data
Apr. 27, 2018   (DE) ..................... 10 2018 206 534.9

(51) Int. Cl.
F02M 25/022    (2006.01)
(52) U.S. Cl.
CPC ............................. *F02M 25/0221* (2013.01)

(58) Field of Classification Search
CPC .................................................. F02M 25/0221
See application file for complete search history.

(56) References Cited

U.S. PATENT DOCUMENTS

| 4,416,610 A * | 11/1983 | Gallagher, Jr. ....... B01F 5/0413 431/4 |
| 4,416,619 A | 11/1983 | Gallagher, Jr. |
| 5,174,247 A | 12/1992 | Tosa et al. |

FOREIGN PATENT DOCUMENTS

| CN | 101688502 A | 3/2010 |
| CN | 107743459 A | 2/2018 |

(Continued)

OTHER PUBLICATIONS

PCT/EP2019/057905, International Search Report dated May 28, 2019 (Two (2) pages).

(Continued)

*Primary Examiner* — Kevin A Lathers
(74) *Attorney, Agent, or Firm* — Crowell & Moring LLP

(57) ABSTRACT

A mixing apparatus for producing a fuel/water mixture for an internal combustion engine includes a fuel line, where via the fuel line a combustion chamber of the internal combustion engine is suppliable with fuel, a connecting region, a water line which opens into the fuel line in the connecting region where via the water line water is introducible via the connecting region into the fuel line and is mixable with the fuel, and a valve arrangement which is disposed on the water line. The valve arrangement prevents an entry of the fuel from the fuel line into the water line when a pressure of the fuel in fuel line is higher than a pressure of the water in the water line.

8 Claims, 2 Drawing Sheets

(56) References Cited

FOREIGN PATENT DOCUMENTS

| | | |
|---|---|---|
| CN | 108286480 A | 7/2018 |
| DE | 32 37 305 A1 | 4/1984 |
| DE | 43 41 938 A1 | 6/1995 |
| DE | 44 35 823 C1 | 12/1995 |
| DE | 196 50 559 C1 | 3/1998 |
| DE | 10 2014 225 815 A1 | 6/2016 |
| EP | 0 553 364 A1 | 8/1993 |
| GB | 2 320 060 A | 6/1998 |
| WO | WO-9635505 A1 * 11/1996 | ......... F02M 25/0228 |

OTHER PUBLICATIONS

German Search Report issued in German application No. 10 2018 298 534.9 dated Jan. 24, 2019, with Statement of Relevancy (Nine (9) pages).

Chinese Office Action issued in Chinese application No. 201980018385.5 dated Nov. 1, 2021, with English translation (Thirteen (13) pages).

* cited by examiner

MIXING DEVICE FOR PRODUCING A FUEL/WATER MIXTURE FOR AN INTERNAL COMBUSTION ENGINE, INTERNAL COMBUSTION ENGINE HAVING A MIXING DEVICE, AND MOTOR VEHICLE

BACKGROUND AND SUMMARY OF THE INVENTION

The invention relates to a mixing apparatus for producing a fuel/water mixture for an internal combustion engine, with at least one fuel line, via which at least one combustion chamber of the internal combustion engine can be supplied at least with pressurized fuel, and with at least one water line which opens into the fuel line in at least one connecting region of the mixing apparatus and via which pressurized water can be introduced via the at least one connecting region into the at least one fuel line and can be mixed with the fuel as a result. Further aspects of the invention relate to an internal combustion engine with a mixing apparatus, and to a motor vehicle with a mixing apparatus and/or with an internal combustion engine.

Due to a constantly increasing volume of traffic, ever stricter exhaust gas limit values are being specified by legislators. In addition to limit values relating to the ideal combustion end product of carbon dioxide ($CO_2$), a maximum permissible emission of pollutants such as carbon monoxide (CO) is also regulated. The adherence to CO limit values is a challenge, in particular, for heavy motor vehicles which are operated by gasoline engine. On account of an increasingly rising power density of internal combustion engines which are configured as gasoline engines, moreover, the cooling of engine components is increasingly gaining in importance. In the case of conventional gasoline engines, the cooling usually takes place by what is known as "enriching", that is to say by operation of the internal combustion engine with a deficiency of air or an excess of fuel. Operation of this type is also called substoichiometric operation or substoichiometric combustion. Here, the enthalpy of evaporation of a fuel quantity which is not required for the combustion is utilized to bring about the cooling of the corresponding engine components. Particularly great quantities of carbon monoxide are produced, however, by way of the "enriching". The cooling of engine components by way of substoichiometric operation is therefore diametrically opposed to the adherence to the statutory CO limit values.

The injection of water, whether in the form of direct injection into respective combustion chambers of the internal combustion engine or in the form of intake manifold injection into an intake manifold of the internal combustion engine, is recognized as a usable solution for simultaneous component cooling and adherence to exhaust gas limit values, not least because of the abovementioned problem.

DE 43 41 038 A1 has disclosed a system for the fuel supply of internal combustion engines. Here, a water pump is connected on the input side to a water reservoir via a pipeline which is provided with a shut-off valve. On the output side, a further pipeline leads from the water pump to a mixer, in which pipeline a control valve or pressure limiting valve is situated. Parallel to this, an additional pipeline with a shut-off valve is routed from a diesel reservoir to the input opening of a diesel pump. On the output side, the latter is connected to the mixer by way of a further additional pipeline, in which a control valve or a pressure limiting valve with a manometer is situated. From there, forwarding is carried out to an emulsifying turbine. From the latter, a gasoil/water emulsion which is produced in the emulsifying turbine flows into an intermediate reservoir through a line, in which, starting from the emulsifying turbine, a control valve or a pressure limiting valve with a manometer, a check valve and a shut-off valve are situated. From there, further transport is carried out to an injection pump, from which the emulsion passes into a pressure line by means of an injection nozzle into the combustion chamber of the internal combustion engine.

It is an object of the invention to provide a mixing apparatus, an internal combustion engine and a motor vehicle of the type mentioned at the outset, by way of which particularly low emission operation is made possible.

The invention proceeds from a mixing apparatus for producing a fuel/water mixture for an internal combustion engine, with at least one fuel line, via which at least one combustion chamber of the internal combustion engine can be supplied at least with pressurized fuel, and with at least one water line which opens into the fuel line in at least one connecting region of the mixing apparatus and via which pressurized water can be introduced via the at least one connecting region into the at least one fuel line and can be mixed with the fuel as a result.

It is provided according to the invention that the mixing apparatus comprises a valve arrangement which is arranged on the at least one water line and prevents an entry of fuel from the at least one fuel line into the at least one water line due to the fluid pressure if a fuel pressure which prevails in the at least one fuel line has a higher pressure value than a water pressure which prevails in the at least one water line. This is advantageous, since, as a result, a penetration of fuel into the water line and therefore, for example, into a water circuit of the mixing apparatus can be prevented effectively, as a result of which it can be avoided that the fuel flows out via the at least one water line. Therefore, a discharge of fuel via the water line is prevented, for example into a water storage container or into the surrounding area, and operation of the mixing apparatus which is particularly low in emissions overall is made possible as a result. As a result, for example, in the case of the freezing point of water being undershot, ventilating of the at least one water line can take place, in order to avoid frost damage, without there being the risk of fuel accidentally also being pumped out via the water line. The term "via" can also be replaced by the term "by means of".

The at least one fuel line can preferably be connected in a manner which is immediately adjacent to the connecting region to at least one injector for the direct injection of the fuel/water mixture into the at least one combustion chamber of the internal combustion engine. Any separation of the fuel/water mixture, which separation can also generally be called a fuel/water emulsion, can be prevented at least largely by way of a direct arrangement or connection of this type of the injector to the fuel line in the connecting region.

The at least one fuel line can preferably be connected in a manner which is immediately adjacent to the connecting region to at least one intake manifold injector for the injection of the fuel/water mixture into an intake manifold of the internal combustion engine. The intake manifold injector can preferably be connected directly in the at least one connecting region to the at least one fuel line, in order to counteract a separation of the fuel/water mixture.

Here, the term "directly" is to be understood generally to mean that there are no further valves and/or mixers (for mixing the fuel and the water to form the fuel/water mixture or to homogenize the fuel/water mixture) between the injector or intake manifold injector and the connecting region.

The term "pressurized fuel" is to be understood to mean that the fuel which is conducted in the at least one fuel line is loaded with the predefined fuel pressure. In other words, the fuel in the at least one fuel line is under pressure, the pressure corresponding to the predefined fuel pressure.

The term "pressurized water" is to be understood to mean that the water is loaded with the predefined water pressure. The water which is conducted in the at least one water line can therefore be under a pressure which corresponds to the water pressure. The water pressure can correspond to a value which can be 2 bar greater, for example, than the fuel pressure.

The fluid pressure-induced prevention of the entry of fuel from the at least one fuel line into the at least one water line takes place, for example, as soon as the water pressure in the water line is lower than the fuel pressure in the fuel line.

The mixing apparatus can have at least one ventilating opening which connects a line interior space of the at least one water line to a surrounding area of the at least one water line, and which can be opened in at least one switching position of the valve arrangement by way of movement of at least one valve body of the valve arrangement. This is advantageous, since, as a result, frost damage, that is to say, for example, bursting of the at least one water line as a consequence of the freezing point of water being undershot, can be prevented in a particularly simple way.

In one advantageous development of the invention, the mixing apparatus comprises at least one connecting element which connects the at least one fuel line in the at least one connecting region in a fluid-conducting manner to the at least one water line, the valve arrangement being integrated into the at least one connecting element. This is advantageous, since, as a result, particularly low-complexity assembly of the mixing apparatus can take place, especially since particularly few individual parts have to be connected to one another. The connecting element can be configured, for example, as what is known as a T-piece, to mention merely one example. By virtue of the fact that the valve arrangement is integrated into the at least one connecting element, the check valve and, in addition or as an alternative, the metering valve can be arranged particularly close to the connecting region, as a result of which particularly favorable thorough mixing of the fuel with the water can take place with production of the fuel/water mixture as a consequence of turbulence in the case of the actuation of the valve arrangement, that is to say of the at least one check valve and, in addition or as an alternative, of the at least one metering valve.

In a further advantageous development of the invention, the valve arrangement comprises at least one check valve and at least one metering valve. This is advantageous, since the entry of fuel from the fuel line into the water line can be prevented in a particularly simple way by way of the check valve due to the fluid pressure, it being possible for particularly needs-oriented metering of a water quantity of the water to be mixed with the fuel in the connecting region to be carried out by way of the metering valve.

The check valve can preferably be configured as a check valve which is operated without current. In other words, the check valve can be operated in an exclusively mechanical manner. As a result, reliable closing of the at least one water line and therefore reliable preventing of the entry of the fuel into the water line are ensured, even, for example, in the case of a malfunction of an energy source which supplies the valve arrangement with electric energy. As an alternative, however, the check valve and the metering valve can also be configured in each case as electrically operable valves. In other words, the check valve can be configured as an electrically operable check valve, and the metering valve can be configured as an electrically operable metering valve.

In a further advantageous development of the invention, the at least one check valve is arranged between the at least one fuel line and the at least one metering valve on the at least one water line. This is advantageous since, as a result, the at least one check valve is arranged particularly close to the connecting region, with the result that a particularly early, fluid pressure-induced prevention of the entry of fuel from the at least one fuel line into the at least one water line can take place.

In a further advantageous development of the invention, the entry of fuel from the at least one fuel line into the at least one water line is prevented by way of the at least one check valve and, in addition or as an alternative, by way of the at least one metering valve in a non-energized state of the valve arrangement. This is advantageous, since, as a result, the entry of fuel into the water line can be prevented effectively, even in the case of a complete failure of a power supply of the valve arrangement. In other words, both the check valve and the metering valve can be closed in the non-energized state of the valve arrangement, with the result that the check valve and the metering valve bring about a redundant shut-off of the at least one water line.

In a further advantageous development of the invention, the mixing apparatus comprises at least one control unit for the electric actuation of the valve arrangement, the at least one control unit being set up to deactivate a low side circuit and a high side circuit of the valve arrangement in each case independently of one another. This is advantageous, since, even in the case of any short circuit in the low side circuit or the high side circuit, a permanent actuation of the valve arrangement and an associated, for example permanent opening of the metering valve and, in addition or as an alternative, of the check valve can be prevented.

In a further advantageous development of the invention, the control unit is set up to deactivate the low side circuit and, in addition or as an alternative, the high side circuit of the valve arrangement in a manner which is dependent on a pressure difference between the fuel pressure and the water pressure. This is advantageous, since the pressure difference represents a variable which can be detected particularly rapidly, with the result that particularly fast deactivating of the low side circuit and, in addition or as an alternative, the high side circuit can take place accordingly. In order to detect the pressure difference, the mixing apparatus can comprise, for example, a differential pressure sensor which can be loaded firstly with the fuel pressure and secondly with the water pressure, and which can be connected in a signal-transmitting manner to the control unit. The corresponding deactivating can take place if the fuel pressure which prevails in the fuel line has the higher pressure value than the water pressure which prevails in the water line.

In a further advantageous development of the invention, the low side circuit and/or the high side circuit can be deactivated by way of energization of at least one external relay. This is advantageous, since the control unit can therefore be of particularly simple construction, and, for example, a particularly low number of switchable pins of the control unit is sufficient, in order to deactivate the low side circuit and, in addition or as an alternative, the high side circuit.

In a further advantageous development of the invention, the at least one water line is arranged at a geodetically lower level at least at the at least one connecting region than the at least one fuel line. This is advantageous, since, as a result, a density difference between the fuel and the water can be utilized in an advantageous way, in order to prevent the entry of the fuel into the water line.

A second aspect of the invention relates to an internal combustion engine with a mixing apparatus in accordance with the first aspect of the invention. The features proposed in conjunction with the mixing apparatus in accordance with the first aspect of the invention and their advantages apply accordingly to the internal combustion engine according to the invention in accordance with the second aspect of the invention, and vice versa.

A third aspect of the invention relates to a motor vehicle with a mixing apparatus in accordance with the first aspect of the invention and, in addition or as an alternative, with an internal combustion engine in accordance with the second aspect of the invention. The features proposed in conjunction with the mixing apparatus according to the invention in accordance with the first aspect of the invention and the internal combustion engine according to the invention in accordance with the second aspect of the invention and their advantages apply accordingly to the motor vehicle according to the invention in accordance with the third aspect of the invention, and vice versa.

Further features of the invention result from the claims, the Figures and the description of the Figures. The features and combinations of features mentioned in the above text in the description and the features and combinations of features which are mentioned in the following text in the description of the Figures and/or are shown solely in the Figures can be used not only in the respectively specified combination, but rather also in other combinations or on their own.

The invention will now be described in greater detail on the basis of one preferred exemplary embodiment and with reference to the drawings.

DETAILED DESCRIPTION OF THE DRAWINGS

Figure 1:
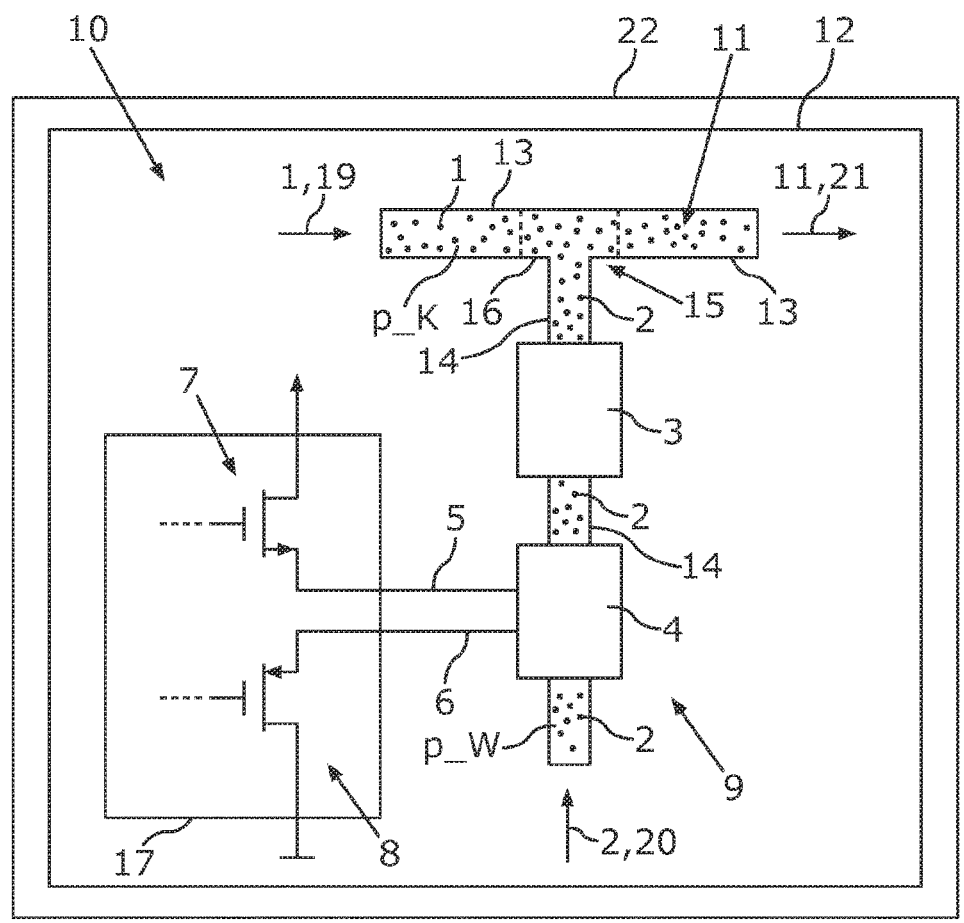
FIG. 1 shows a diagrammatic illustration of a mixing apparatus for producing a fuel/water mixture.
Figure 2:
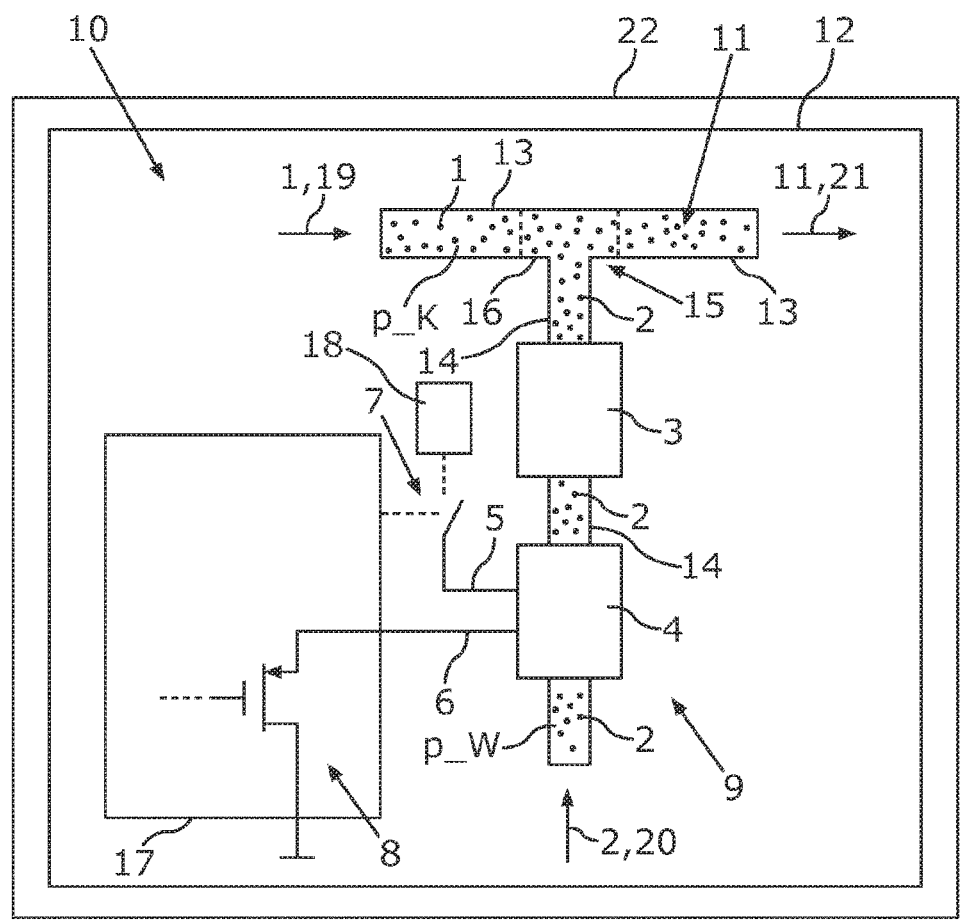
FIG. 2 shows a diagrammatic illustration of one variant of the mixing apparatus.

FIG. 1 and FIG. 2 in each case show a diagrammatic illustration of a motor vehicle 22 which comprises an internal combustion engine 12. The internal combustion engine 12 comprises a plurality of combustion chambers which are not shown in further detail here, it being possible for each combustion chamber to be supplied with fuel 1 or with a fuel/water mixture 11 via at least in each case one injector which is configured for direct injection and is likewise not shown in further detail here. The fuel 1 or the fuel/water mixture 11 is converted (burned) at least partially in the respective combustion chambers, in order to move respective pistons which are assigned to the respective combustion chambers and are not shown in further detail here, and therefore to drive a crankshaft (likewise not shown in further detail) of the internal combustion engine 12.

The mixing apparatus 10 serves to produce the fuel/water mixture 11 for the internal combustion engine 12. The mixing apparatus 10 comprises at least one fuel line 13, via which the respective combustion chambers of the internal combustion engine 12 can be supplied with the pressurized fuel 1. The pressurizing of the fuel 1 can take place by means of a fuel pump (not shown).

Furthermore, the mixing apparatus 10 comprises at least one water line 14 which opens in at least one connecting region 15 of the mixing apparatus 10 into the fuel line 13, and via which pressurized water 2 can be introduced via the at least one connecting region 15 into the at least one fuel line 13 and can be mixed with the fuel 1 as a result. Via the mixing apparatus 10, the pure fuel 1 or, as an alternative, the fuel/water mixture 11 can therefore be fed to the respective combustion chambers. The pressurizing of the water 2 can take place by means of a water pump (not shown).

The mixing apparatus 10 comprises a valve arrangement 9 which is arranged on the at least one water line 14 and which prevents an entry of fuel 1 from the at least one fuel line 13 into the at least one water line 14 due to the fluid pressure if a fuel pressure p_K which prevails in the at least one fuel line 13 has a higher pressure value than a water pressure p_W which prevails in the at least one water line 14.

The at least one water line 14 is arranged at a geodetically lower level in the at least one connecting region 15 than the at least one fuel line 13.

The valve arrangement 9 comprises a check valve 3 and a metering valve 4. In the present case, the check valve 3 is arranged between the at least one fuel line 13 and the metering valve on the at least one water line.

In addition, the mixing apparatus 10 comprises at least one connecting element 16 which is configured as a T-piece in the present case and which connects the at least one fuel line 13 in the at least one connecting region 15 to the at least one water line 14 in a fluid-conducting manner. The valve arrangement 9 can generally be integrated into the at least one connecting element 16, although this is not shown in further detail in FIG. 1 and FIG. 2.

In the present case, the check valve 3 is configured as a purely mechanically actuated check valve, whereas the metering valve 4 of the valve arrangement 9 can be actuated by means of a control unit 17 of the mixing apparatus 10. In the present case, the control unit 17 therefore serves for the electric actuation of the valve arrangement 9, the control unit 17 being set up to deactivate a low side circuit 8 and a high side circuit 7 of the valve arrangement 9 in each case independently of one another.

The low side circuit 8 is connected via a low side line 6 to the metering valve 4. The high side circuit 7 is connected via a high side line 5 to the metering valve 4.

In the present case, the control unit 17 is set up to deactivate the low side circuit 8 and the high side circuit 7 of the valve arrangement 9 in a manner which is dependent on a pressure difference between the fuel pressure p_K and the water pressure p_W.

The high side circuit 7 and the low side circuit 8 form respective, switchable outputs of the control unit 17 which can also be called an electronic control unit. Via the high side circuit 7 and the low side circuit 8, the high side line 5 and the low side line 6, respectively, to the metering valve 4 can be switched off in each case individually, with the result that, for example, a short circuit in the low side line 6 does not lead to a permanent actuation of the metering valve 4.

Although this is not shown in FIG. 1 and FIG. 2, the check valve 3 can thus also be configured as an electrically operated check valve instead of as a mechanical check valve. In this case, an actuation of the check valve 3 can likewise take place via a high side circuit (not shown in further detail here) or a low side circuit.

In general, the entry of fuel 1 from the at least one fuel line 13 into the at least one water line 14 is prevented by way of the at least one check valve 3 and by way of the at least one metering valve 4 in the non-energized state of the valve arrangement 9.

In contrast to FIG. 1, FIG. 2 shows one variant of the mixing apparatus 10, it being possible in the present case for the high side circuit 8 of the metering valve 4 to be deactivated by way of energization of an external relay 18 of the mixing apparatus 10. The term "external" is to be understood to mean that the relay 18 is not integrated into the control unit 17.

In order to produce the fuel/water mixture 11, the fuel 1 which flows through the fuel line 13 in a flowing direction 19 which is illustrated by way of an arrow is mixed in the connecting region 15 with the water 2 which flows through the water line 14 and through the check valve 3 and the metering valve 4 in a flowing direction 20 which is illustrated by way of a further arrow, to form the fuel/water mixture 11. The fuel/water mixture 11 then flows in a flowing direction 21 which is illustrated by way of a further arrow to the respective injectors (not shown).

The mixing apparatus 10 can ensure a supply of the internal combustion engine 12 or its respective combustion chambers with the fuel/water mixture 11 which can also be called an emulsion of fuel 1 and water 2. Furthermore, the mixing apparatus 10 can ensure that no discharge of fuel 1 to the surrounding area, that is to say no entry of fuel 1 from the at least one fuel line 13 into the at least one water line 14, occurs in the case of mechanical or electric component faults of the mixing apparatus 10. One example for a mechanical component fault is, for example, jamming of the check valve 3 or of a valve body of the check valve 3 in an open position. One example for an electric component fault is, for example, a short circuit in the low side line 6 and, in addition or as an alternative, in the high side line 5.

In the case of the present mixing apparatus 10, the at least one fuel line 13 and the at least one water line 14 are connected to one another by means of the check valve 3 and the metering valve 4 in the at least one water line 14. The check valve 3 and the metering valve 4 are therefore closed in series and, as a result, ensure that an entry of fuel 1 from the at least one fuel line 13 into the at least one water line 14 does not occur if the water pressure p_W has a lower pressure value than the fuel pressure p_K, or if the water pressure should collapse. The water 2 can be loaded with the water pressure p_W which can lie, for example, 2 bar above the fuel pressure p_K, from a water storage container of a water pressure system (water circuit) which is not shown in further detail here, and can be introduced in accordance with the flowing direction 20 into the at least one water line 14 or can flow into the water line 14.

As has already been mentioned, the check valve 3 can be of mechanical or electromechanical configuration. In the present case, the metering valve 4 for regulating a water mass of the water 2 is of electromechanical configuration and, in addition, is of self-closing configuration. The check valve 3 and the metering valve 4 therefore form a redundant solution.

LIST OF REFERENCE CHARACTERS

1 Fuel
2 Water
3 Check valve
4 Metering valve
5 High side line
6 Low side line
7 High side circuit
8 Low side circuit
9 Valve arrangement
10 Mixing apparatus
11 Fuel/water mixture
12 Internal combustion engine
13 Fuel line
14 Water line
15 Connecting region
16 Connecting element
17 Control unit
18 External relay
19 Flowing direction
20 Flowing direction
21 Flowing direction
22 Motor vehicle
p_K Fuel pressure
p_W Water pressure

What is claimed is:

1. A mixing apparatus for producing a fuel/water mixture for an internal combustion engine, comprising:
    a fuel line wherein via the fuel line a combustion chamber of the internal combustion engine is suppliable with fuel;
    a connecting region;
    a water line which opens into the fuel line in the connecting region wherein via the water line water is introducible via the connecting region into the fuel line and is mixable with the fuel;
    a valve arrangement which is disposed on the water line, wherein the valve arrangement prevents an entry of the fuel from the fuel line into the water line when a pressure of the fuel in fuel line is higher than a pressure of the water in the water line; and
    a connecting element configured as a T-piece which connects the fuel line in the connecting region in a fluid-conducting manner to the water line and wherein the valve arrangement is integrated into the connecting element;
    wherein the valve arrangement comprises a check valve and a metering valve;
    wherein the entry of the fuel from the fuel line into the water line is prevented by the check valve and/or by the metering valve in a non-energized state of the valve arrangement.

2. The mixing apparatus according to claim 1, wherein the check valve is disposed on the water line between the fuel line and the metering valve.

3. The mixing apparatus according to claim 1 further comprising a control unit, wherein the control unit electrically actuates the valve arrangement and wherein the control unit is configured to deactivate a low side circuit and a high side circuit of the valve arrangement independently of one another.

4. The mixing apparatus according to claim 3, wherein the control unit is configured to deactivate the low side circuit and/or the high side circuit of the valve arrangement dependent on a pressure difference between the pressure of the fuel and the pressure of the water.

5. The mixing apparatus according to claim 3, wherein the low side circuit and/or the high side circuit is deactivatable by energization of an external relay.

6. The mixing apparatus according to claim 1, wherein the water line is disposed at a geodetically lower level than the fuel line at the connecting region.

7. An internal combustion engine, comprising:
the mixing apparatus according to claim 1.
8. A motor vehicle, comprising:
the mixing apparatus according to claim 1.

\* \* \* \* \*